L. C. BURNET.
HOUSEHOLD UTENSIL OR THE LIKE.
APPLICATION FILED MAR. 28, 1914.
1,147,001.
Patented July 20, 1915.
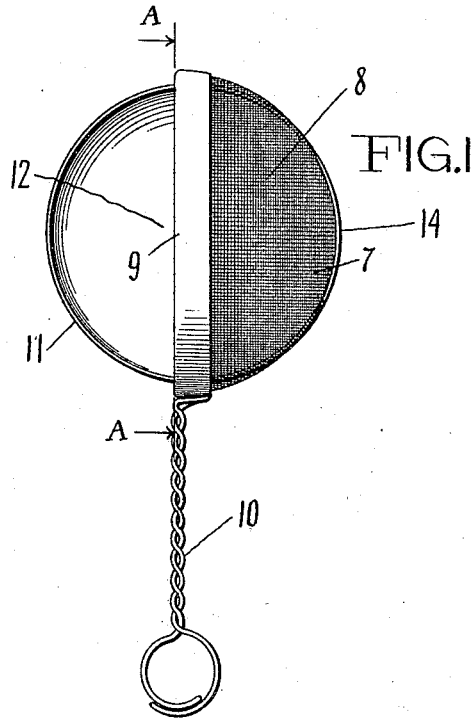
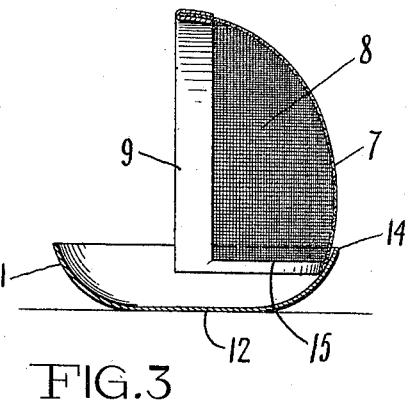
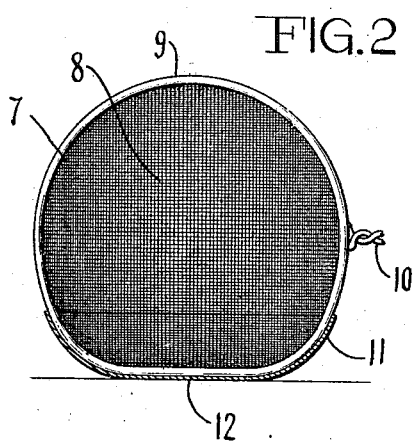
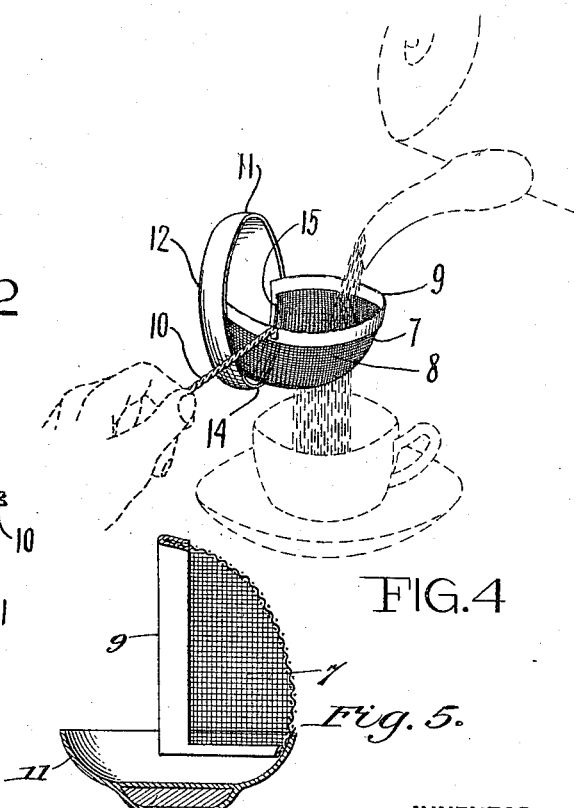
WITNESSES:
Arthur Choquet
Lillian L. Malzer.
INVENTOR.
Lewis C. Burnet
BY
Clifford L. Dunn
ATTORNEY

UNITED STATES PATENT OFFICE.

LEWIS C. BURNET, OF BLOOMFIELD, NEW JERSEY.

HOUSEHOLD UTENSIL OR THE LIKE.

1,147,001.  Specification of Letters Patent.  Patented July 20, 1915.

Application filed March 28, 1914. Serial No. 827,800.

*To all whom it may concern:*

Be it known that I, LEWIS C. BURNET, a citizen of the United States, residing at Bloomfield, in the county of Essex and State of New Jersey, have invented certain new and useful Improvements in Household Utensils or the like, of which the following is a full, clear, and exact description.

The present invention relates generally to improvements in household utensils and more particularly to a strainer or the like for use in connection with coffee or tea pots, or for such purposes where it is desired to strain a liquid substance to withdraw or recover solid particles or bodies therefrom.

The present invention is directed to the provision of a strainer or utensil of the character referred to, which will be simple and inexpensive to manufacture, which is so constructed that it may be readily cleansed after use so as to remove any foreign substance therefrom, which might result in contamination, thereby producing an absolutely sanitary appliance for household or other uses.

A further object of my invention is the provisions of a strainer or utensil embodying the characteristics heretofore recited, which will be so constructed as to prevent the dripping of the residual liquid therefrom after use, the formation of the strainer parts and their relation to each other being such that a perfectly balanced article is produced which will be self-supporting when placed upon any flat surface, such as a table top or the like, thereby eliminating any possibility of the residue falling upon or otherwise coming in contact with the table top or the like. This is of material importance in an article of this kind since it is of great annoyance to housewives and others using strainers, to have the linens and other table accessories soiled by drippings from the strainers used by them.

Many other advantages of my invention will present themselves to those skilled in the art from the following description of the construction and method of using my invention.

I shall now proceed to describe my invention with reference to the accompanying drawings, and then point out with more particularity the essential elements of novelty therein, in the annexed claims.

In the drawings, Figure 1 is a top plan view of my improved strainer. Fig. 2 is a front elevation on the line A—A of Fig. 1. Fig. 3 illustrates a modified form of my invention, and Fig. 4 is a diagrammatic view showing my improved strainer in use. Fig. 5 illustrates a further modification of my invention, wherein the base is weighted so as to make it noncapsizable.

Referring now to the drawings in detail, in which like characters of reference are employed to designate similar parts throughout the several views, 7 indicates a strainer of the usual semi-spherical type, formed of reticulated fabric 8, which is supported by an annular metal frame 9, to one portion of the periphery of which is suitably secured, either by riveting or soldering thereto, the handle or supporting means 10. While this handle is formed in the present embodiment of twisted wire, it is obvious that the same may be made of a flat or round piece of metal or may be made of wood or any other suitable material. The structure, thus far described, it will be manifest, comprises the parts of an ordinary or common strainer today in use, which, while it attains the desired result in so far as an efficient strainer is concerned, is most unsatisfactory by reason of the fact that there is no provision made for preventing liquid dripping therefrom after the strainer has been used, the user having frequently to make a hurried movement or transfer of the strainer to a receptacle or some surface on which the drippings therefrom may fall. Therefore, to overcome these disadvantages, I attach to the annular supporting frame 9 of the strainer, a concave or saucer-shaped receptacle or member 11, which is preferably drawn or spun from a single blank of sheet metal and which is so formed as to provide a flat supporting surface as shown at 12 in Figs. 2 and 3, this surface providing a base for my improved strainer. The concave or saucer-shaped member 11 may be rigidly fastened or secured to the frame of the strainer by rivets or by soldering, the object being, in securing these parts together, to provide a tight joint so that there is no possibility of any matter being deposited therebetween.

In the production of my strainer, I form the saucer-shaped or concave member 11 of a sufficient size so that when the strainer 7 is mounted therein, the edge of said member contiguous to the reticulated portion 8 of the strainer 7 will extend slightly beyond the vertical plane thereof as indicated at 14 in Fig. 1. This provides an effective means for catching any drippings from the residue remaining within the strainer after use.

In the modification shown in Fig. 3, it will be noted that prior to positioning the strainer within the saucer-shaped or concave member 11, the same is cut off on a straight line as indicated at 15, the frame of the strainer and the reticulated fabric being suitably secured to the inner wall of the saucer-shaped or concave member 11.

In use, my invention is employed in the same manner as the ordinary strainer, as will be apparent from the diagrammatic view shown in Fig. 4, the strainer being preferably held in the left hand of the user and over the cup or receptacle into which the liquid from the cooking utensil held in the right hand of the user, is poured. It will be observed that when the strainer is in use, there is no possibility of the liquid flowing from the cooking utensil splashing or spattering over the outer edge of the strainer by reason of the relative position thereto, of the saucer-shaped or concave member 11. When the user is through with the strainer, the natural movement of the hand in removing the strainer from over the receptacle into which the liquid has been poured, is such as to turn the strainer to a position where the saucer-shaped member lies in a horizontal plane, the placing of the saucer-shaped member on the table top or other suitable support in this position naturally changes the position of the strainer relatively thereto, and it is obvious that any liquid separating itself from the residue within the strainer will drop into and be caught by the concave or saucer-shaped receptacle or member 11. If desired, the flattened or base portion of the member 11 may be suitably weighted as shown at 11$^a$ (Fig. 5) so as to automatically move the member 11 to its supporting position regardless of the manner in which the strainer is deposited upon the supporting surface.

While I have described my invention with reference to the specific details of structure herein shown, it is obvious that the same may be changed in minor particulars without departing from the spirit and scope of my invention.

Having thus described my invention what I claim as new herein and desire to secure by Letters Patent is:—

1. In an article of the character described, a strainer of a substantially hemi-spherical configuration formed of reticulated fabric, annular supporting frame for the fabric and a concave member secured to the periphery of said frame and having a portion of its outer surface flattened to provide a base for supporting said frame in a vertical position, whereby the fabric portion of the strainer will lie wholly within the vertical plane of the periphery of said concave member.

2. In an article of the character described, a supporting member having a concave surface, an annular frame mounted within said concave member and at a right angle to the horizontal plane thereof and a strainer portion of substantially hemi-spherical configuration formed of reticulated fabric secured to said frame, said frame and said strainer portion lying wholly within the vertical plane of the edge of said concave member.

3. As a new article of manufacture, a strainer consisting of an annular frame, having a perforated straining portion of a hemi-spherical configuration secured thereto, a handle attached to said frame and a saucer-shaped receptacle joined to a portion of said frame, the frame being supported by the receptacle in a plane at a right angle to the horizontal plane of the receptacle and said frame, and said straining portion lying wholly within the vertical plane of the edge of the receptacle, whereby the receptacle will receive the residual drippings from said strainer under predetermined conditions.

4. An article of the character described, embodying a concave receptacle, a supporting frame mounted therein and positioned at a right angle to the horizontal plane of the receptacle and a hemi-spherical strainer formed of reticulated fabric and secured to said supporting frame, said strainer and said frame lying wholly within the vertical plane of the edge of said receptacle, whereby under certain predetermined conditions, said receptacle will catch the residual drippings from said strainer.

5. An article of the character described, embodying a concave receptacle, a supporting frame mounted therein and positioned at a right angle to the horizontal plane of the receptacle and a hemi-spherical strainer formed of reticulated fabric and secured to said supporting frame, said strainer and said frame lying wholly within the vertical plane of the edge of said receptacle, whereby, under certain predetermined conditions said receptacle will catch the residual drippings from said strainer, and a handle secured to said supporting frame.

In witness whereof I have hereunto set my hand in the presence of two subscribing witnesses.

LEWIS C. BURNET.

Witnesses:
WM. C. DUNN,
LILLIAN L. MALZER.